United States Patent [19]

Wu et al.

[11] Patent Number: 5,554,460
[45] Date of Patent: Sep. 10, 1996

[54] MULTI-LAYERED COATED MEMBRANE ELECTRODES FOR ELECTROCHEMICAL CELLS AND CELLS USING SAME

[75] Inventors: Han Wu, Barrington; John E. Nerz, Hawthorn Woods, both of Ill.

[73] Assignee: Motorola, Inc., Schaumburg, Ill.

[21] Appl. No.: 276,679

[22] Filed: Jul. 5, 1994

[51] Int. Cl.$^6$ .................................................. H01M 6/48
[52] U.S. Cl. .................. 429/210; 429/233; 429/234; 429/246; 429/247; 429/248; 429/249; 429/218; 429/191; 429/94; 429/129; 429/133; 429/152; 429/164; 429/165; 429/209
[58] Field of Search .............................. 429/164, 165, 429/161, 152, 94, 129, 133, 140, 141, 233, 246, 247, 248, 191, 209, 210, 218, 234, 245, 249, 236; 361/502, 503, 504, 505, 506, 523, 524, 525, 526, 528, 532

[56] References Cited

U.S. PATENT DOCUMENTS

| | | | |
|---|---|---|---|
| 3,793,060 | 2/1974 | Weininger et al. ...................... | 117/98 |
| 4,298,666 | 11/1981 | Taskier ..................................... | 429/206 |
| 5,047,300 | 9/1991 | Juergens .................................. | 429/94 |
| 5,342,709 | 8/1994 | Yahnke et al. .......................... | 429/247 |
| 5,368,961 | 11/1994 | Juergens .................................. | 429/94 |

*Primary Examiner*—Bruce F. Bell
*Attorney, Agent, or Firm*—Kenneth M. Massaroni

[57] ABSTRACT

An electrochemical cell includes an electrode (10) having a microporous polymeric substrate (12) upon which is deposited the first and second layers (18 and 22) of an electrochemically material. Disposed between said first and second layers of electrochemically active materials is a current collecting layer adapted to electrically couple the electrode with a battery cell can. Two or more of such electrodes (40 and 60) may be stacked one atop the other in order to affect a positive and negative electrode as used in conventional cylindrical cells.

10 Claims, 6 Drawing Sheets

5,554,460

MULTI-LAYERED COATED MEMBRANE ELECTRODES FOR ELECTROCHEMICAL CELLS AND CELLS USING SAME

TECHNICAL FIELD

This invention relates in general to electrodes for electrochemical cells and more particularly to electrodes having membrane substrates, and adapted for use in such cells.

BACKGROUND OF THE INVENTION

There has been a great deal of interest in developing better and more efficient methods for storing energy for applications such as radio communication, satellites, portable computers and electrical vehicles to name but a few. There have also been concerted efforts to develop highpower, cost effective batteries having improved performance characteristics, particularly as compared to storage system in the art.

Currently available battery systems are either primary (i.e., not rechargeable) or secondary (rechargeable). Each system has advantages for different applications. For example, electrodes for rechargeable batteries may be regenerated many times by the application of an electrical charge thereto. As a result, rechargeable batteries are preferred for many consumer electronic applications. Conversely, primary cells are not rechargeable, however, primary cells are made to hold a greater charge and hence are preferred in applications in which longer life is required.

Heretofore, the electrode has usually been composed of a metal grate or foil for current collection attached to, or having attached thereto, a layer or layers of porous electrochemically active material. Sintered metal matrices have also been used to eliminate or reduce the need for the metal foil. The advantage of using a sintered material is that it provides higher surface area for the hetrogenous electrochemical reactions to take place. However, most porous matrices exhibit relatively poor electrical conductivity. Accordingly, a current collector/grid is preferred if high-power applications are required.

Heretofore, the active materials used in such cells were produced by one or more of the following methods:

(1) via chemical reaction such as lead/lead oxide in a lead acid battery;

(2) electrolytic impregnation such as nickel hydroxide/nickel oxyhydroxide in a nickel battery;

(3) sintered electrodes as is employed in the metal hydroxide electrode of a nickel-metal hydride battery;

(4) powder or fiber bonded by Teflon or other binders as is commonly employed in nickel electrodes; and (5) pressed powders such as high-surface area carbon in double-layered capacitors.

Each of the methods described above relies on the use of powders as the starting materials. The powders typically have powder particle size in the range of a few microns to a few hundred microns. Since most oxides/hydroxides are not conductive, once the surface of the powder is converted, the core of the particle is blocked from further reaction. Thus, utilization of the active material is generally low in most conventional battery materials.

Therefore, there exists a need for a new technology which does not rely on the powder metallurgy processes characterized by the prior art and hence enhances the surface to volume ratio so as to improve the electrochemical performance of the electrode material. Moreover, such a material should be readily fabricated by readily available, commercially proven fabrication techniques.

DETAILED DESCRIPTION OF THE PREFERRED EMBODIMENT

Figure 1:
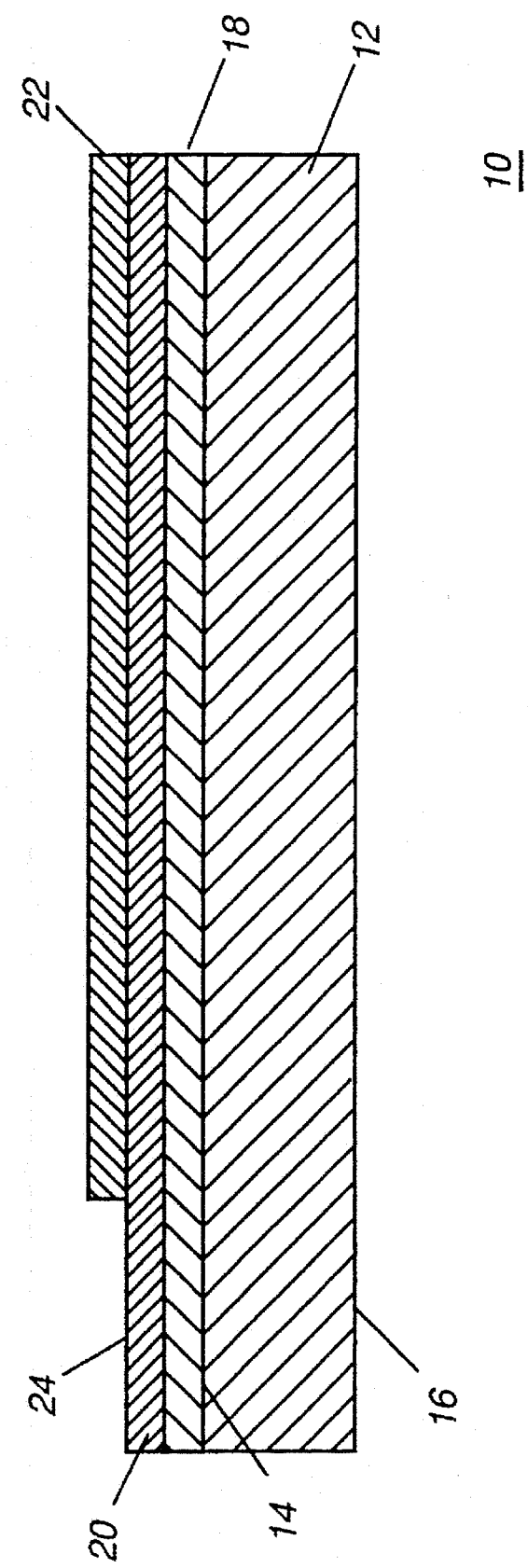
FIG. 1 is a cross-sectional side view of an electrode fabricated in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an electrode fabricated in accordance with the instant invention. The electrode (10) includes a microporous membrane substrate (12) having first and second major surfaces (14) and (16) and pore size on the order of between 10 and 500 nanometers and preferably between 100 and 300 nanometers. The porous membrane substrate may be fabricated of any of a number of organic polymeric materials known in the art, including, for example, microporous polypropylene membranes, polyethylene, cellophane, nylon, polyvinyl alcohol (PVA), and combinations thereof. Other microporous membranes polymeric materials may be employed so long as they meet the following criteria 1. The membrane must be chemically and mechanically stable in the electrochemical cell environment, accordingly it must be stable in up to 45% KOH solution.

2. The membrane should be acceptable microporous (i.e., on the order of 40% or more), with said microporosity being controllably reproducible in a manufacturing environment.

3. The membrane should be an electrical insulator.

4. The membrane should be compatible with the electrolyte chosen for the electrochemical cell and hence also absorb said electrolyte.

Disposed on the first major surface (14) of the microporous membrane substrate (12) is a first layer (18) of an electrochemically active material. For example, in a nickel metal hydride battery, layer (18) may be a layer of a metal hydride charge storage material as is known in the art. Alternatively, layer (18) may be a lithium or a lithium intercalation material as is commonly employed in lithium batteries. The distinguishing characteristic of layer (18) is the depth to which the active material is deposited. In a preferred embodiment, the layer of electrochemically active materials should be deposited to a depth of between 3 and 200 nanometers and preferably approximately 30–100 nanometers. It is to be noted that the thickness of this layer is substantially less than that commonly available in the prior art methods. For example, in powder methods, as described hereinabove, typical layer thicknesses are on the order of approximately in the range of 5 to several hundred micrometers, i.e., up to two or more orders of magnitude thicker. As discussed hereinabove, utilization of powdered active material is therefore generally quite low as the surface to volume ratio is quite poor. Accordingly, the thinner layers described herein should provide better electrochemical performance.

Disposed atop layer (18), is a current collecting layer (20). The current collecting layer may be fabricated of any of a number of metals known in the art. Examples of such metals include, for example, nickel, copper, stainless steel, silver, titanium, and other suitable metals known in the art. The current collecting layer (20) is typically deposited atop layer (18) to a thickness of approximately 10 to 1000 nanometers. By comparison, the thinnest foils commonly available in the prior art methods are approximately in an order of magnitude greater in thickness. For example, the thinnest titanium foils available are approximately 6 micrometers thick; lithium 30 micrometers; and nickel 6 micrometers. Accordingly, when using nickel foil of 10 micrometers thickness as in the current collector in a AA size "jelly roll" cylindrical cell, the internal resistance is calculated, if concentric circles are used to simulate the spiral, to be approximately 8.9 milliohms for each concentric layer, or approximately 0.15 milliohms for all layers which can be packed into a cell. The decrease in internal resistance is mainly due to the increase of total electrode surface as a result of decreasing thickness of each layer. It has been found that a 10-fold reduction in the thickness of the current collector, i.e., from about 10 to about 1 micron, will still exhibit at least an order of magnitude higher conductivity than currently available cells.

Disposed atop the current collection layer (20) is a second layer (22) of electrochemically active material. The material (22) is prepared in the same manner and in the same thickness as is that described hereinabove with respect to layer (18). Moreover, layer (22) may be fabricated via the same or different active materials. For example, in the embodiment in which the electrode (10) is the positive electrode of a cylindrical cell, layers (18) and (22) would be fabricated of the same material. Alternatively, in other electrochemical devices, such as capacitors, the layers (18) and (22) would be fabricated of different materials, one adapted to act as the positive active material and the second to act as the negative active material with a current collecting layer disposed therebetween. This type of device is illustrated and described in greater detail hereinbelow with respect to FIG. 5.

The second layer (18) is deposited in such a manner as to mask off a region (20) of the current collecting layer (16). Region (20) is provided in connection with the embodiment in which layers (14) and (18) are fabricated of the same material. The region (20) may be provided to effect electrical connection with, for example, a cylindrical cell can, as is necessary in order to effect electrical communication between the electrode and a terminal on the cell. Region (20) may be formed by any of a number of known techniques in the art, including masking, etching, and combinations thereof.

Figure 2:
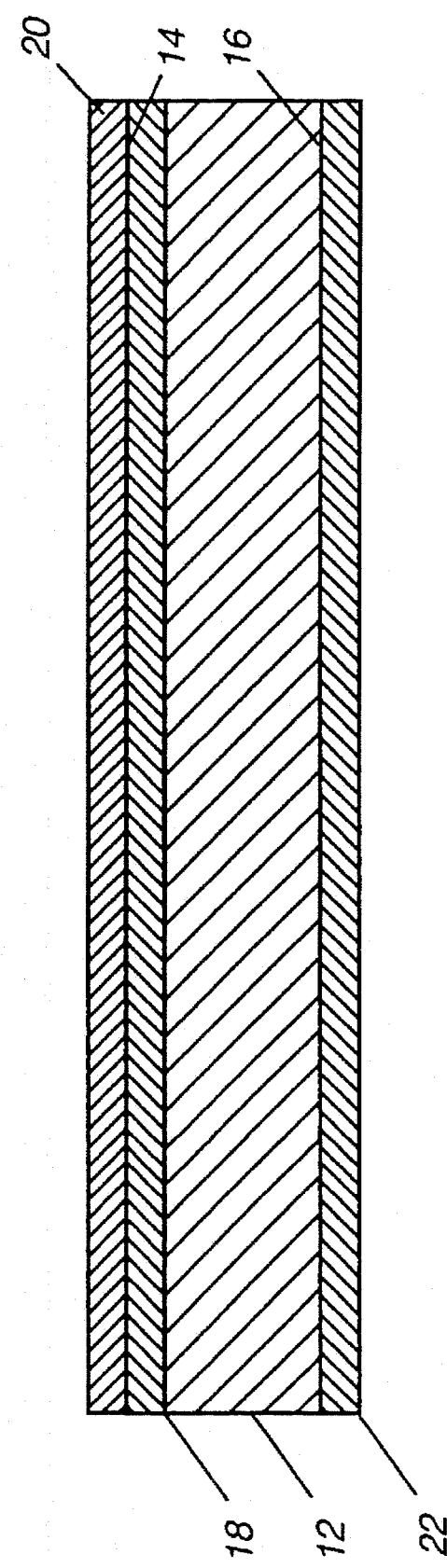
FIG. 2 is a cross-sectional side view of an alternate embodiment of an electrode fabricated in accordance with the instant invention.

Referring now to FIG. 2, there is illustrated a cross-sectional side view of an alternate embodiment of an electrode fabricated in accordance with the instant invention. In the embodiment in FIG. 2, the first layer of chemically active material (18), disposed on the first major surface (14) of the microporous membrane substrate (12), as is illustrated in FIG. 1. Thereafter, disposed atop layer (18) is a layer of a current collecting electrode material (20) such as that described hereinabove with respect to FIG. 1. However, the embodiment of FIG. 2 differs from that of FIG. 1 in that the second layer of electrochemically active material (22) is disposed on second major surface (16) of microporous membrane substrate (12). The configuration illustrated in FIG. 2, like that of FIG. 1, can be employed in a number of different types of electrochemical cell applications. One such application will be described hereinabove with respect to FIGS. 4 and 5.

Figure 3:
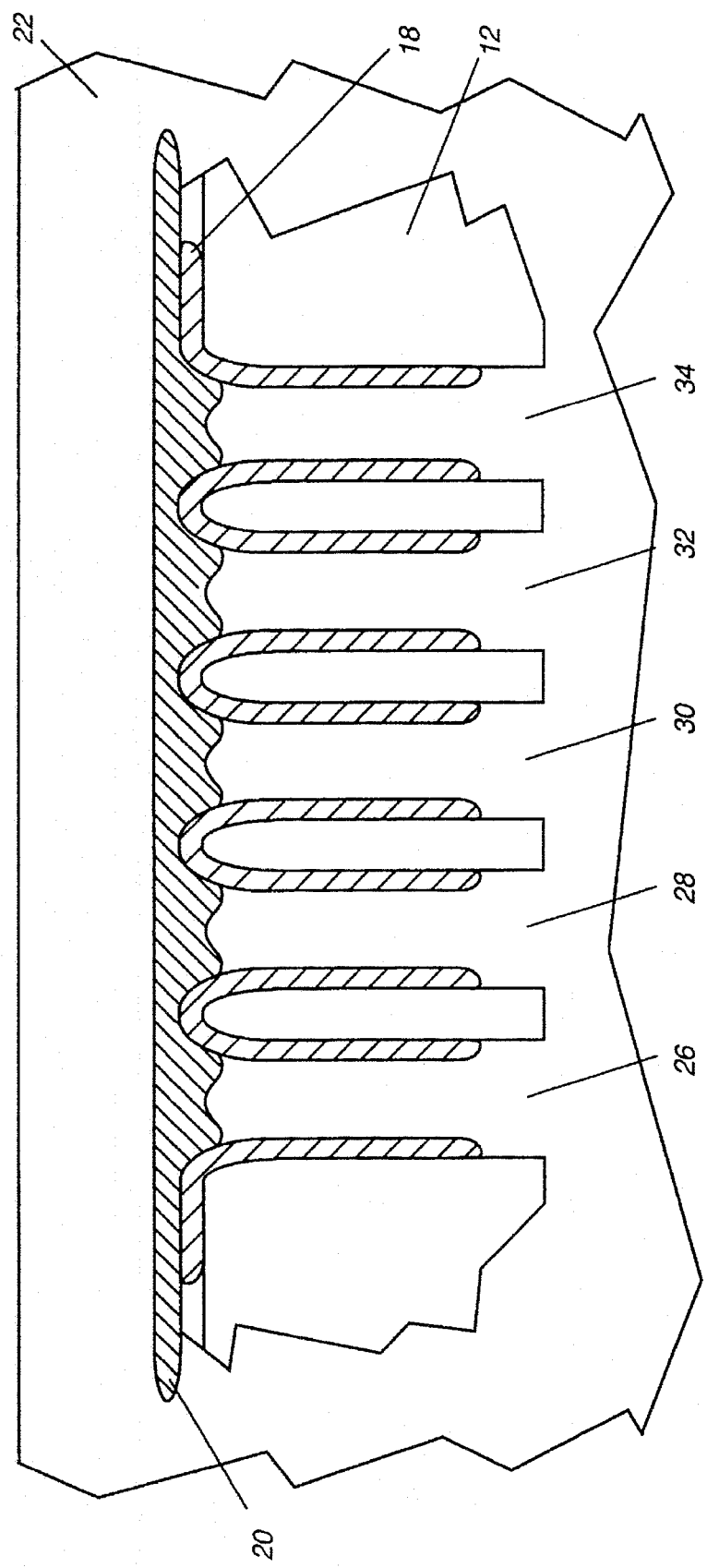
FIG. 3 is a partial cross-sectional side view of the porous substrate electrode fabricated in accordance with the instant invention.

Referring now to FIG. 3, there is illustrated a cross-sectional side view of the electrode fabricated in accordance with the instant invention, and wherein the figure illustrates deposition of the active layers, and the current collecting layer of the embodiment of FIG. 1, on a pore scale. In FIG. 3, microporous membrane substrate (12) has a plurality of pores (26, 28, 30, 32, 34) formed therein. As noted above, the bulk pore size is approximately 10 to 500 nanometers. Disposed atop substrate (12) is a layer of electrochemically active material, such as (18) described hereinabove. Thickness of this layer should generally be around ⅓ of the diameter of the pores (22–30) to avoid plugging the pore openings. Accordingly, in an embodiment in which the substrate (12) has bulk-pore size of about 50 nanometers, the thickness of active material layer (18) could be between approximately 17 and 20 nanometers. Alternatively, if the porous membrane substrate has bulk pore size of approximately 300 nanometers, a layer (18) of approximately 100 active nanometers is acceptable.

On the layer of active material (18) the pores should further be made in such a manner that the active material can penetrate into the pores at a pre-selected distance. The layer of active material may be deposited by using any acceptable technique such as sputter coating, electroless deposition, chemical vapor deposition and others. The only requirement is that the temperature of the membrane during the deposition process be held below the melting point/glass transition point of the membrane. It is also important that the thickness and uniformity of the coating of layer (18) be carefully controlled as noted above so as to avoid clogging pores on the membrane.

Thereafter a layer of the current collecting materials such as that described hereinabove is deposited atop the first layer of the active material (18). The current collecting layer (20) may be deposited by any of a number of known anisotropic methods such as those described hereinabove. However, as an anisotropic deposition technique is necessary, electroless deposition should not be used. Moreover, during the deposition of the current collection layer (20) the membrane should be positioned at an angle with respect to the source of the deposited material and further rotated during the deposition so that incoming particles of the current collector are deposited at an angle, avoiding completely covering the interwalls of the pores and hence closing the pores on the active material side. The thickness of the layer of the current collector is determined by the electrical conductivity of the material and the application for which it is desired. However, the layer (20) should be thick enough to provide the lowest possible electric resistance though thin enough to give high energy and power densities. In general, 0.2 to 1.0 micrometers is preferred.

Thereafter a second layer of active material (22) is deposited atop the current collecting layer (20). The layer (22)

may be such as described hereinabove with respect to FIG. 1. Moreover, as pores 26–34 have already been plated over, no special precautions are necessary with respect to the deposition technique. The layer only need be uniformly deposited to a thickness as described hereinabove.

Figure 4:
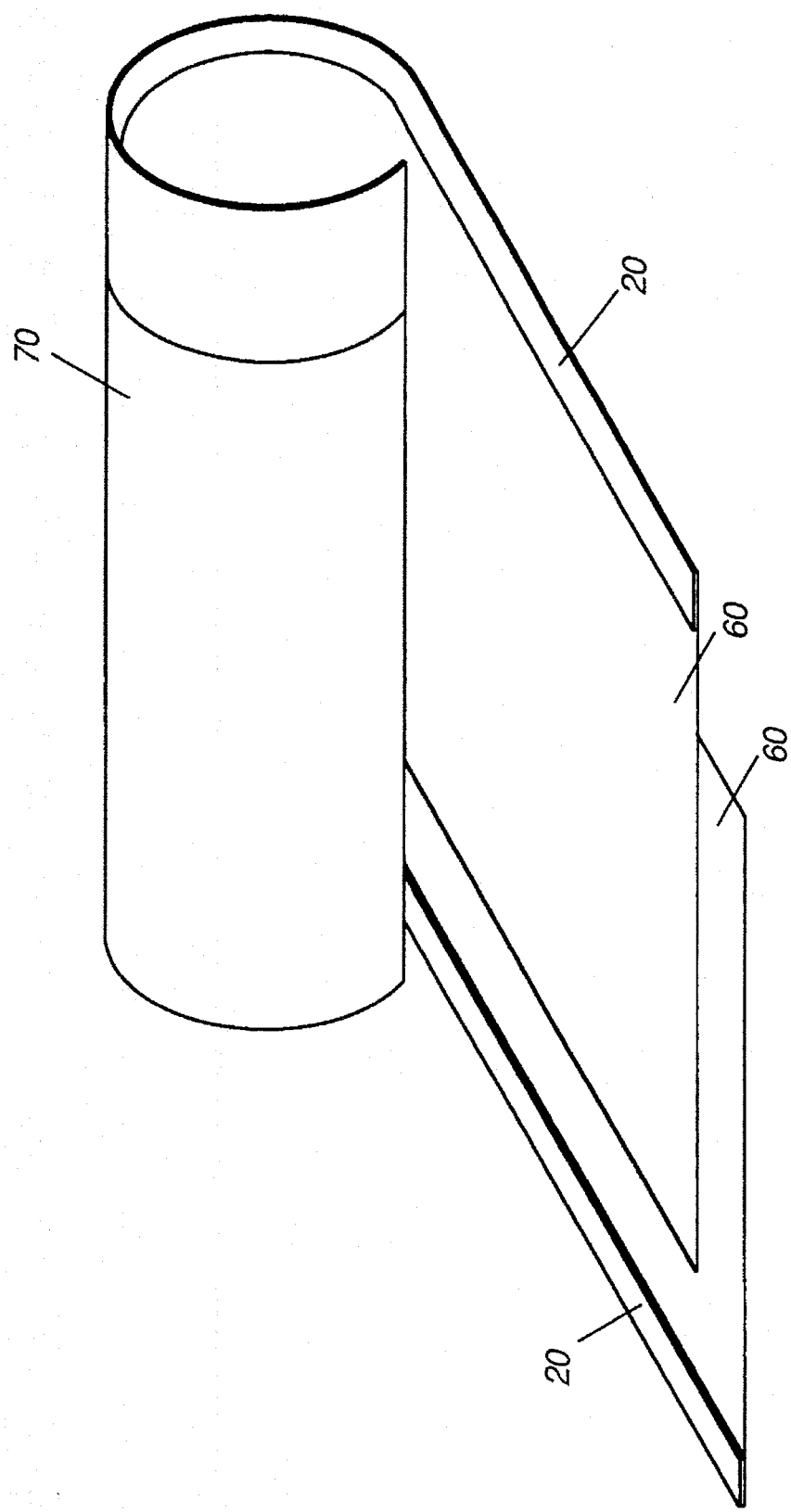
FIG. 4 is a perspective view of a plurality of electrodes fabricated in accordance with the instant invention in an arranged and stacked configuration in order to effect an electrochemical cell.
Figure 5:
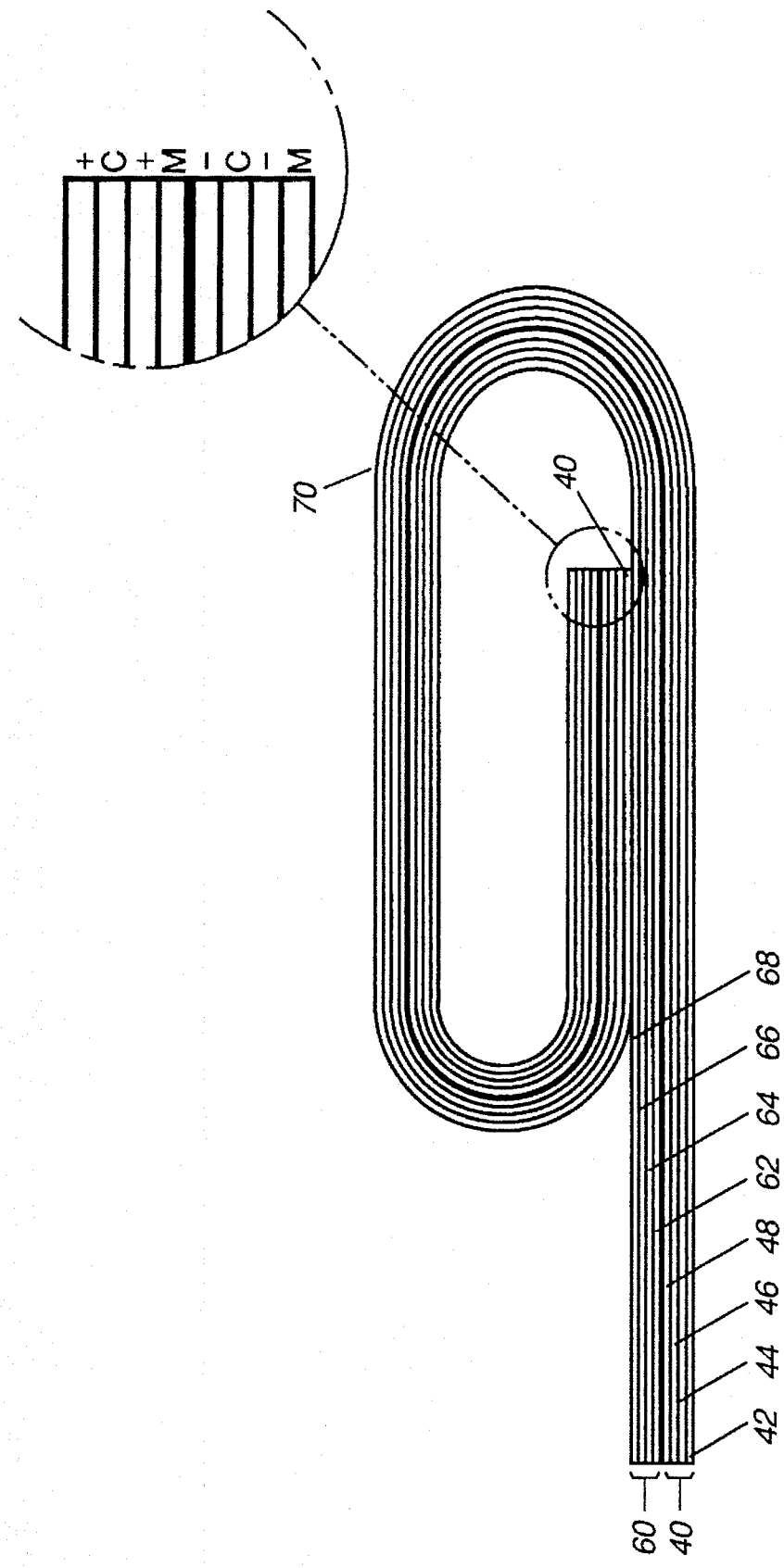
FIG. 5 is a schematic side view of a plurality of electrodes fabricated in accordance with the instant invention, and arranged in stacked relationship with respect to one another.

Referring now to FIGS. 4 and 5, there is illustrated therein an embodiment in which two electrodes fabricated as described hereinabove with respect to FIGS. 1 and 3 are assembled in a so-called "jelly roll" configuration so as to make a rechargeable cell. In the embodiment of FIGS. 4 and 5, two electrodes (40 and 60) are provided as described hereinabove. Electrode (40) is fabricated with two layers of, for example, negative/active electrochemical material while electrode (60) is fabricated with two layers of positive electrode material. Each electrode (40 and 60) is provided with a current collecting region (20) such as described hereinabove with respect to FIG. 1. The current region (20) is disposed on the current collector, and allows for electrical communication between the electrode itself and a terminal on the outside of the cylindrical cell can (not shown) into which the electrode stack of FIG. 4 may be inserted. The electrodes (40 and 60) are arranged in stacked relationship with the current collecting regions (20) disposed on opposite edges of the stack. Thereafter, the stack is rolled into a roll (70) for a subsequent insertion into an electrochemical cell can (not shown).

Referring now to FIG. 5, there is illustrated therein a cross-sectional cut-away view of the stacked configuration illustrated in FIG. 4. In this embodiment, electrodes (40 and 60) can be seen in stacked orientation. Electrode (40) comprises substrate (42) first layer of negative active material (44), current collecting layer (46), and second layer of active material (48). Disposed immediately atop layer (48) is the membrane substrate (62) of electrode (60). Thereafter the first layer of active material (64) is disposed atop said membrane (62) with current collecting layer (66) disposed thereover and second layer of active material (68) disposed atop said current collecting layer.

As the configuration is rolled into roll (70) the outer membrane layer is rolled into contact with the membrane substrate layer (42) of electrode (40) is rolled into contact with the second layer of active material (68) of electrode (60). In this way, the membrane substrate layers act as a separator to electrically isolate the positive and negative electrodes from one another. Moreover, as the membranes are porous, they may be filled with a liquid electrolyte such as is known in the art. Accordingly, the membrane allows for deposition of ultra-thin electrode layers, and current collecting layers, while providing the function of both electrolyte reservoir and separator. The result is ultra-thin electrodes having extremely high capacity.

In the embodiment of FIG. 2, the first and second layers of electrochemically active material are disposed on opposite sides of the same substrate (12). This type of structure may also be employed in, for example, a "jelly roll" type cylindrical cell. However, in order to electrically insulate the layers of different active material from each other, it is necessary to provide said electrode with a layer of insulator material. A second uncoated layer of the porous membrane substrate material may be advantageously employed in this role.

Figure 6:
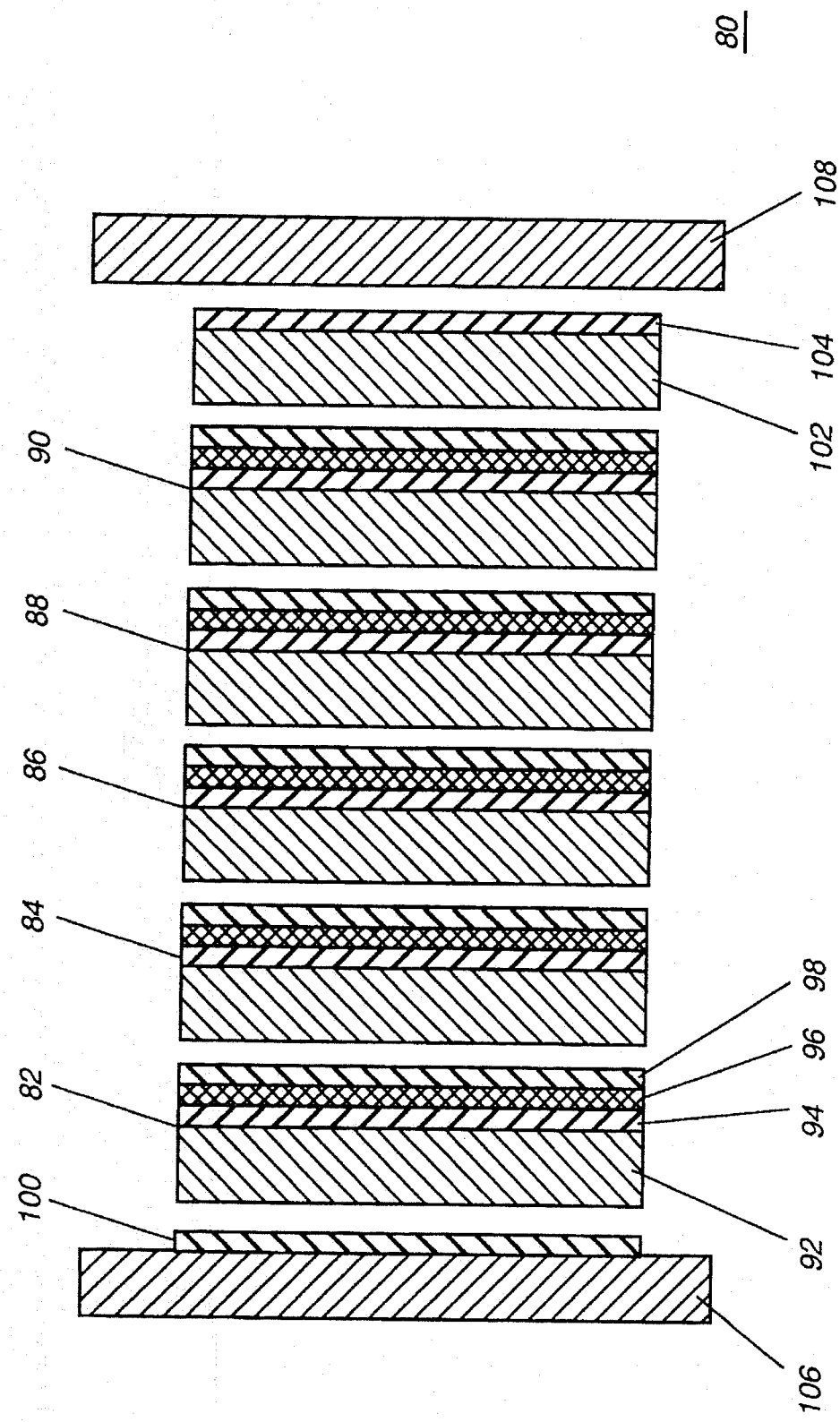
FIG. 6 is an alternate embodiment of a plurality of electrodes fabricated in accordance with the instant invention and arranged in stacked relationship.

Referring now to FIG. 6, there is illustrated therein an alternative embodiment of the instant invention wherein the first and second layers of electrochemically active material are fabricated as different materials. Such an embodiment is contemplated for bi-polar batteries and capacitors as are known in the art. In such an embodiment, a device (80) comprises a plurality of stacked alternatively coated membrane electrodes (82, 84, 86, 88, and 90 respectively). As each of electrodes (82–90) are identical, only one will be described in detail herein. Electrode (82) comprises a microporous polymeric membrane substrate (92) as described hereinabove with respect to FIG. 1. Thereafter, a layer of negative active material (94) is disposed atop the substrate layer (92). A current collecting layer (96) such as that described hereinabove is deposited atop layer (94). Thereafter a layer of positive active material (98) is disposed atop the current collecting layer (86). As may be appreciated from perusal of FIG. 6., the cells (82–90) are then arranged in stacked relationship so that the substrate of each cell is disposed atop the positive active material layer of the preceding cell. Disposed beneath the lower most cell (82) is a layer of positive active material (100), while disposed atop the upper most cell (90) is a substrate layer (102) having a layer of negative material (104) deposited thereon. Layers (100, 102 and 104) are provided to assure proper electrical coupling between cells (82 and 90) and end plates (106, 108). End plates (106 and 108) are provided to enclose the stack structure, as well as provides electrical communication beyond the device.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrode for an electrochemical cell, said electrode comprising:

an electrochemically inert substrate having a first and a second surface, and fabricated of a porous membrane material selected from the group consisting of polypropylene, polyethylene, polyvinyl alcohol, nylon, and combinations thereof, and having pores formed therein, said pores having a bulk pore size of between 10 nm and 500 nm said substrate further functioning as the separator material for the electrochemical cell into which said electrode is incorporated;

a first layer of electrochemically active material deposited on said first surface of said substrate, and into the pores formed therein said layer deposited to a thickness of between 3 and 200 nm;

a current collecting layer deposited atop said first layer of said first electrochemically active material, said current collecting layer deposited to a thickness of between 0.01 and 1.0 μm; and a second layer of electrochemically active material, said second layer deposited to a thickness of between 3 and 200 nm.

2. An electrode as in claim 1, wherein said first and second layers are fabricated of the same electrochemically active material.

3. An electrode as in claim 1, wherein said first and second layers of the electrochemically active material are fabricated of different electrochemically active materials.

4. An electrode as in claim 1, wherein said second layer of electrochemically active material is not deposited on a peripheral edge portion of said current collecting layer.

5. An electrode as in claim 1, wherein said substrate is a porous polypropylene membrane.

6. An electrochemical cell comprising:

at least a first and a second substrate each substrate having a first and a second major surface, said substrate fabricated of a porous membrane material selected from the group consisting of polypropylene, polyethylene, polyvinyl alcohol, nylon, and combinations thereof, and having pores formed therein, and a bulk pore size between 10 and 500 nm;

a first electrode disposed on one surface of said first substrate, said first electrode comprising a first layer of a first electrochemically active material disposed on said first substrate to a depth of between 3 and 200 nm, a current collecting layer disposed on said first layer of electrochemically active material, and a second layer of said first electrochemically active material, deposited atop said current collecting layer to a thickness of between 3 and 200 nm;

a second electrode disposed on one surface of said second substrate, said second electrode comprising a first layer of a second electrochemically active material, material disposed on said second substrate to a depth of between 3 and 200 nm, a current collecting layer disposed on said first layer of said second electrochemically active material, and a second layer of said second electrochemically active material deposited atop said current collecting layer to a thickness of between 3 and 200 nm;

said first and second electrodes arranged in a stacked configuration with the substrate of one said electrode disposed atop the second layer of electrochemically active material of said second electrode; and wherein said first and second substrates further function as a separator layer between first and second electrodes.

7. An electrochemical cell as in claim 6, wherein said current collecting layers are disposed to thickness of between 0.01 and 1.0 µm.

8. An electrochemical cell as in claim 6, wherein said second layers of electrochemically active material are not deposited on one peripheral edge of said current collecting layers, defining a contact region on each electrode.

9. An electrochemical cell as in claim 8, wherein said contact region of said first substrate is oriented opposite the contract region of said second substrate.

10. An electrochemical cell as in claim 6, wherein said substrate is a porous polypropylene member.

* * * * *